United States Patent [19]

Miyaji et al.

[11] 4,321,509
[45] Mar. 23, 1982

[54] DIMMER

[75] Inventors: Masahiro Miyaji; Hisashi Hirose, both of Toyota, Japan

[73] Assignee: Toyota Jidosha Kogyo Kabushiki Kaisha, Toyota, Japan

[21] Appl. No.: 150,352

[22] Filed: May 16, 1980

[30] Foreign Application Priority Data

May 23, 1979 [JP] Japan .................................. 54/64468

[51] Int. Cl.³ ............................................ H05B 39/04
[52] U.S. Cl. .................................... 315/291; 315/127; 315/208; 315/224; 315/225; 361/111
[58] Field of Search .............. 315/200 A, 208, 209 R, 315/224, 225, 291, 119, 127, DIG. 4; 328/8; 331/62; 361/91, 101, 111; 363/56

[56] References Cited

U.S. PATENT DOCUMENTS

| | | | |
|---|---|---|---|
| 3,253,186 | 5/1966 | Rogers et al. | 315/225 X |
| 3,793,535 | 2/1974 | Chowdhuri | 361/111 |
| 3,858,088 | 12/1974 | Scarpino et al. | 315/224 X |
| 3,893,043 | 7/1975 | Fukuoka | 331/62 X |
| 4,134,101 | 1/1979 | Jones, Jr. | 361/111 X |

Primary Examiner—Eugene R. LaRoche
Attorney, Agent, or Firm—Cushman, Darby & Cushman

[57] ABSTRACT

A dimmer suitable for use to control the intensity of illumination of a lamp or lamps for illuminating an instrument panel provided in a compartment of a vehicle such as a motor car, comprises: a dimming transistor connected to a lamp or lamps to be dimmed for controlling an electric current supplied to said lamp or lamps, a switching circuit connected to said dimming transistor for generating pulses having a controllable duty ratio to cause said dimming transistor to turn 'ON' on 'OFF', surge voltage sensing means for sensing a surge voltage applied to an electric source line, and transistor shutoff means for shutting off said dimming transistor in response to a signal from said surge voltage sensing means.

4 Claims, 6 Drawing Figures

F I G. 3
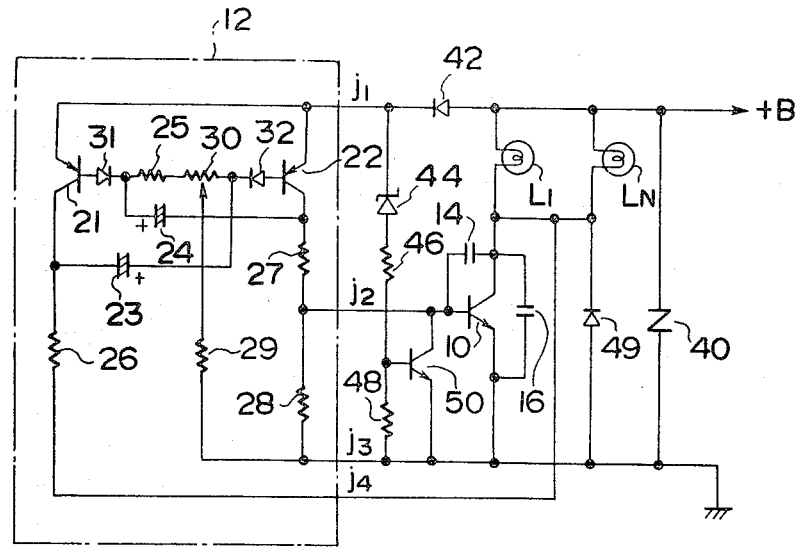
F I G. 4
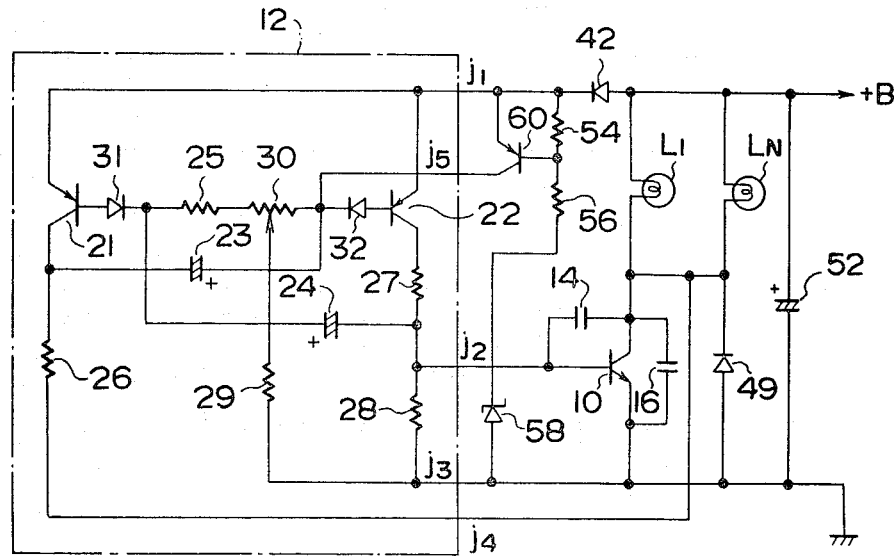

DIMMER

BACKGROUND OF THE INVENTION

1. Field of the Invention

This invention relates to dimmers, and particularly to improvements in a dimmer suitable for use to control the intensity of illumination of a lamp or lamps for illuminating an instrument panel provided in a compartment of a vehicle such as a motor car, comprising a dimming transistor connected to a lamp or lamps to control an electric current supplied to the lamp or lamps and a switching circuit connected to said dimming transistor for generating pulses having a controllable duty ratio so as to turn 'ON' or 'OFF' said dimming transistor.

2. Prior Art

It is desirable that the intensity of illumination of the lamp or lamps for illuminating the instrument panel provided in the compartment of the vehicle such as the motor car are suitably varied in accordance with the running condition of the vehicle. More specifically, in the case external illuminations such as neon signs are many as the vehicle runs through urban districts, it is desirable to increase the intensity of illumination of the illuminating lamp or lamps, so that the visibility of instruments in the instrument panel may be increased. On the other hand, in the case external illumination are few as the vehicle runs through suburban districts, it is desirable to decrease the intensity of illumination of the illuminating lamp or lamps, so that the fatique of eyes may be prevented. Consequently, heretofore, for the abovedescribed purpose, there has been practised to insert a sliding resistor into a lamp circuit in series, whereby said resistor is increased or decreased in resistance, so that the intensity of illumination of the lamp can be controlled. However, with this arrangement, such disadvantages have been presented that an electric current to be supplied is high in value, thus resulting in low durability of the dimmer.

On the other hand, in order to reduce the heat generation due to dimming, materialize high reliability and durability and obtain a smooth and comfortable dimming characteristics, there has been proposed a transistor chopper type dimmer as shown in FIG. 1. Referring to FIG. 1, designated at $L_1$–$L_N$ are lamps to be dimmed, 10 a dimming transistor connected to said lamps $L_1$–$L_N$ for controlling electric currents supplied to said lamps, 12 a transistor chopper type switching circuit connected to said dimming transistor and generating pulses having a controllable duty ratio to turn on or off said dimming transistor 10, +B an electric power terminal connected to a battery not shown, and 14 and 16 noise arresting capacitors provided between the poles of the dimming transistor for preventing noises caused by the switching of the switching circuit 12 from being mixed with radio or the like, in which 14 is the waveshaping capacitor constituting a Miller integrator and 16 is the capacitor for preventing oscillations of a circuit constituted by the lamps $L_1$–$L_N$, capacitor 14 and dimming transistor 10.

As shown in FIG. 1 for example, said switching circuit 12 comprises a non-stable multi-vibrator constituted by transistors 21, 22, capacitors 23, 24, resistors 25, 26, 27, 28 and 29 and variable resistor 30. The duty ratio of the pulses generated by this switching circuit is controllable by the control of the variable resistor 30. Furthermore, the capacitors 23, 24 are choppering capacitors and the resistors 25–29 and variable resistor 30 are choppering resistors.

In the conventional transistor chopper type dimmer as described above, pulses having a preset duty ratio determined by the variable resistor 30 in the switching circuit 12, and the switching of the transistor 10 is controlled by said pulses, with the result that the currents supplied to the lamps $L_1$–$L_N$ are controlled, so that the quantity of light generated can be controlled.

In the conventional transistor chopper type dimmer as described above, in order to prevent the noise mixing with a communication equipment such as a radio of the malfunction of an electrical equipment such as an electrically controlled fuel injection device due to the switching, the noise arresting capacitors 14 and 16 are inserted between a base and collector or between a collector and emitter of the transistor 10, as shown in FIG. 1, to lengthen the time periods required for rise or fall of the switching. This leads to the tendency of increasing of the heat generation in the dimming transistor 10. Consequently, in order to prevent this, it is necessary to reduce a voltage $V_{ceo}$ between the collector and emitter of the transistor 10. However, due to the characteristics of semiconductors, if the voltage $V_{ceo}$ is reduced, then a breakdown voltage Vces between the collector and emitter is necessitated to be low. Consequently, as frequently experienced with the actual vehicles, when a positive surge voltage, in which the rise time is $t_1 = 1$ μsec – 10 msec, the fall time is $t_2 = 1$ msec – several hundred msec and the peak voltage is $V_p$ = several ten – several hundred V as shown in FIG. 2, is applied to the power line through the power terminal +B as shown in FIG. 1, the dimming transistor 10 may be broken down, thus resulting in low reliability of the dimmer.

SUMMARY OF THE INVENTION

This invention has been developed to obviate the abovedescribed problems of the prior art, and has as its object the provision of a dimmer, wherein, in case a surge voltage is applied to the power line, the dimming transistor will not be broken down, to thereby obtain a dimmer of extremely high reliability.

According to the present invention, a dimmer comprises:

- a dimming transistor connected to a lamp or lamps to be dimmed for controlling currents supplied thereto,
- a switching circuit connected to said dimming transistor for generating pulses having a controllable duty ratio to turn 'ON' or 'OFF' said dimming transistor,
- surge voltage sensing means for sensing a surge voltage applied to a power line,
- and transistor shutoff means for shutting off said dimming transistor in response to a signal from said surge voltage sensing means, thereby enabling to achieve the abovedescribed object.

Or, said surge voltage sensing means comprises a varistor for absorbing part of the surge voltage to reduce the surge voltage to less than a first preset voltage value and a Zener diode connected in parallel to said varistor for operating at a second preset voltage value which is lower than said first voltage value, when the surge voltage is applied thereto, and said transistor shutoff means comprises a shutoff transistor for operating, when said Zener diode is operated, to directly shut off said dimming transistor, thereby improving the reliabilities of the surge voltage sensing means and transistor shutoff means in operation.

Or, said surge voltage sensing means comprises a capacitor for integrating the surge voltage to reduce the peak value of the surge voltage and a Zener diode connected in parallel to said capacitor for operating, when the surge voltage is supplied thereto, and said transistor shutoff means comprises a shutoff transistor for operating, when said Zener diode is operated, to stop the generation of pulses in said switching circuit, whereby said dimming transistor is shut off, thereby also improving the reliabilities of the surge voltage sensing means and transistor shutoff means in operation.

Or, said surge voltage sensing means and transistor shutoff means are combined into a single Zener diode for operating, when the surge voltage is applied thereto, to prevent the pulse output fed by said switching circuit from being transmitted to said dimming transistor, whereby the Zener diode functions as both the surge voltage sensing means and transistor shutoff means, thereby simplifying the construction.

Or, said surge voltage sensing means and transistor shutoff means are combined into a Zener diode for operating, when the surge voltage is applied thereto, to directly shut off said dimming transistor, whereby the Zener diode functions as both the surge voltage sensing means and transistor shutoff means, thereby simplifying the construction.

BRIEF DESCRIPTION OF THE DRAWINGS

The above mentioned features and objects of the present invention will become more apparent by reference to the following description taken in conjunction with the accompanying drawings, wherein like referenced numerals denote like element, and in which:

FIG. 3 is a circuit diagram showing the arrangement of the first embodiment of the dimmer according to the present invention;

FIG. 4 is a circuit diagram also showing the second embodiment;

DETAILED DESCRIPTION OF THE INVENTION

Figure 1:
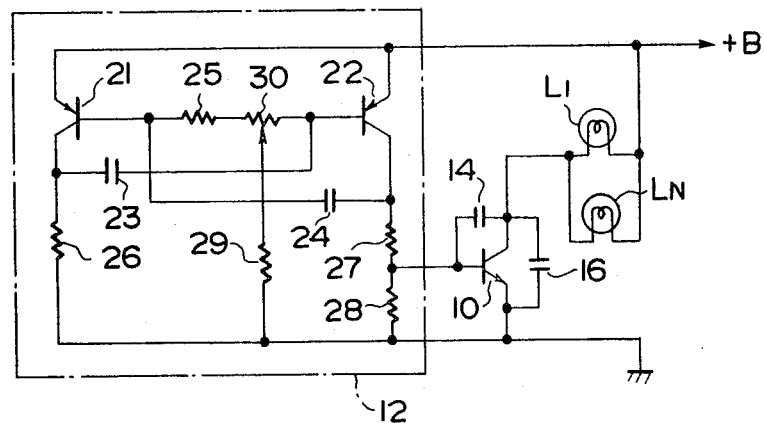
FIG. 1 is a circuit diagram showing an example of the conventional transistor chopper type dimmer.

Detailed description will hereunder be given of the embodiments of the present invention with reference to the drawings. As shown in FIG. 3, a first embodiment of the present invention is of such an arrangement, in the dimmer similar to the conventional example as shown in said FIG. 1, there are additionally provided surge voltage sensing means including a varistor 40 inserted between power terminal +B and the grounding, a diode 42 inserted between the power terminal +B and the power line of the switching circuit 12, a Zener diode 44 inserted between a cathode constituting an output end of said diode 42 and the grounding, resistors 46 and 48, and a diode 49 inserted between the power control terminals of lamps $L_1$-$L_N$ and the grounding, and transistor shutoff means having a shutoff transistor 50, the base of which is connected to a connecting point between the resistors 46 and 48 of said surge voltage sensing means, the collector of which is connected to a base of said dimming transistor 10, and the emitter of which is grounded; reverse-current preventing diodes 31 and 32 are additionally provided; and further an output end of the resistor 26 in the switching circuit 12 is directly connected to the power control terminals of the lamps $L_1$-$L_N$. Since other respects are similar to the conventional example as shown in FIG. 1, description thereof will be omitted.

Description will hereunder be given of operation. Firstly, during normal condition where no surge voltage is applied to the power terminal +B, voltages applied to opposite ends of the Zener diode 44 through the diode 42, resistors 46 and 48 are lower than the preset voltage values, whereby the Zener diode 44 is kept 'OFF'. Consequently, the electric potential of the base of the shutoff transistor 50 is kept substantially at the grounding potential and said shutoff transistor 50 is kept 'OFF', whereby the dimming transistor 10 is turned 'ON' or 'OFF' in response to the pulse output having a preset duty ratio determined by the variable resistor 30 of the switching circuit 12, so that powers commensurate to the ratio between said 'ON' and 'OFF' operation time can be supplied to the lamps $L_1$-$L_N$ to dim same.

Figure 2:
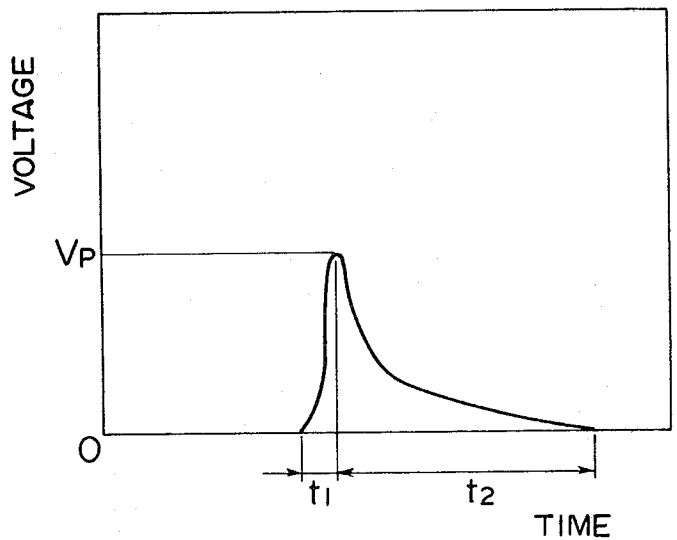
FIG. 2 is a chart showing an example of the positive surge voltage having possibilities to be applied to the power source line.

On the other hand, when a positive surge voltage as shown in FIG. 2 is applied to the power terminal +B, part of the surge voltage is absorbed by the varistor 40, whereby the surge voltage is shaped to less than a first preset voltage value $V_{z1}$. When the output $V_{z1}$ thus shaped is applied to the Zener diode 44, said Zener diode 44 is turned 'ON', whereby an electric potential is generated at a connecting point between the resistors 46 and 48. Then, the shutoff transistor 50 is turned 'ON' to thereby turn the dimming transistor 10 'OFF'. Consequently, no excessively large voltage will be applied to the dimming transistor 10, thereby preventing the burnout of lamps $L_1$-$L_N$. Either one of the above descriptions has explained the cases of preventing the occurrence of the positive surge voltage, however, the negative surge voltage is also absorbed by the varistor 40, diodes 42 and 49.

In this embodiment, the surge voltage sensing means functions to absorb part of the surge voltage, so that the surge voltage sensing means and transistor shutoff means can be reliably operated with high reliabilities.

FIG. 4 shows a second embodiment of the present invention. This embodiment differs from the aforesaid first embodiment in that the surge voltage sensing means comprises a capacitor 52 inserted between the power terminal +B and the grounding, the diode 42 inserted between the power terminal +B and the power line of the switching circuit 12, resistors 54, 56 and a Zener diode 58 inserted between a cathode constituting an output end of the diode 42 and the grounding, and a diode 49 inserted between the power control terminals of the lamps $L_1$-$L_N$ and the grounding, the transistor shutoff means comprises a shutoff transistor 60, the base of which is connected to the connecting point between the resistors 54 and 56, the emitter of which is connected to the power line of the switching circuit 12, and the collector of which is connected to a connecting point between the diode 32 and the variable resistor 30 of the switching circuit 12, and one end of the capacitor 24 of the switching circuit 12 is connected to the connecting point between the resistors 27 and 28. Since the other respects are similar to the first embodiment, description thereof will be omitted.

In this embodiment also, during normal condition where no surge voltage is applied to the power terminal +B, the shutoff transistor 60 is kept 'OFF' through the action of the Zener diode 58, the dimming transistor 10 is turned 'ON' and 'OFF' by the pulse output having the duty ratio determined by the value of the variable resistor 30 in the switching circuit 12 in the same manner as in the prior art, so that the lamps $L_1$-$L_N$ can be dimmed by the switching output.

On the other hand, when the positive surge voltage as shown in FIG. 2 is applied to the power terminal +B, the surge voltage is integrated by the capacitor 52 and the peak value thereof is decreased. The surge voltage thus decreased in the peak value is transmitted to the output end of the diode 42 to thereby turn the Zener diode 58 'ON'. Then, the electric potential at the connecting point between the resistors 54 and 56 is lowered than the power source voltage, whereby the shutoff transistor 60 is turned 'ON' to thereby turn 'OFF' the transistor 22 of the switching circuit 12. Then, the oscillations in the switching circuit 12 is stopped, whereby no pulse output is applied to the dimming transistor 10, so that the dimming transistor 10 is protected from the positive surge voltage. In this embodiment also, the protection from the negative surge is carried out by the capacitor 52, diodes 42 and 49 absorbing the negative surge voltage.

In this embodiment also, the surge voltage sensing means functions to absorb part of the surge voltage, so that the surge voltage sensing means and transistor shutoff means can be reliably operated with high reliability.

Figure 5:
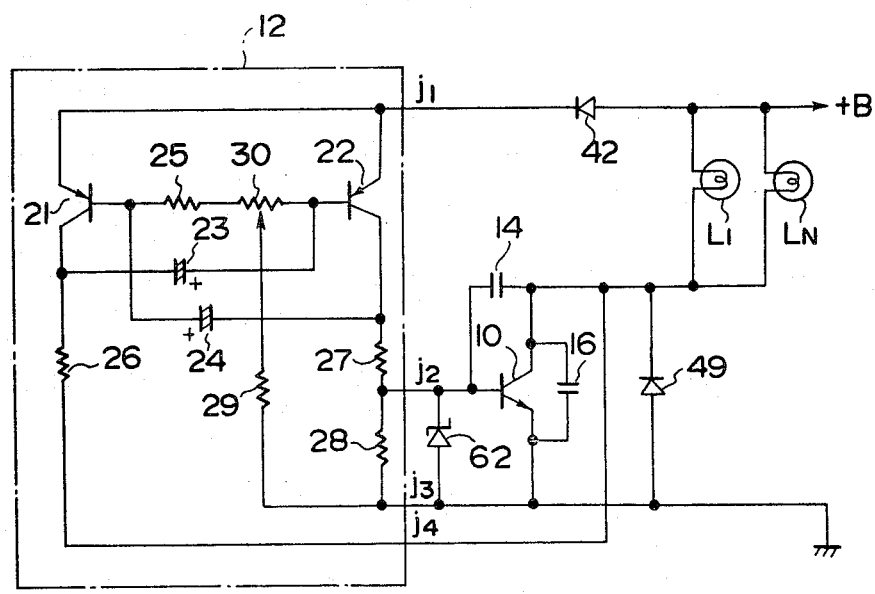
FIG. 5 is a circuit diagram also showing the third embodiment.

FIG. 5 shows a third embodiment of the present invention. This embodiment is of such an arrangement that, in the dimmer similar to the conventional example as shown in FIG. 1, there are additionally provided surge voltage sensing means comprising the diode 42 inserted between the power terminal +B and the power line of the switching circuit 12, the diode 49 inserted between the power control terminals of the lamps $L_1$-$L_N$ and the grounding, and a Zener diode 62 inserted between the base and the emitter of the dimming transistor 10, and transistor shutoff means comprising a Zener diode 62 in common use with the surge voltage sensing means; and an output end of the resistor 26 of the switching circuit 12 is directly connected to the power control terminals of the lamps $L_1$-$L_N$. Since other respects are similar to the conventional example as shown in FIG. 1, description thereof will be omitted.

In this embodiment, firstly, during normal condition, where no surge voltage is applied thereto, voltage applied to opposite ends of the Zener diode 62 through the transistors 22 and the resistor 27 are less than the preset voltage values, whereby the Zener diode 62 is kept 'OFF'. Consequently, the dimming transistor 10 is turned 'ON' and 'OFF' by the pulse output having the preset duty ratio determined by the value of the variable resistor 30 of the switching circuit 12 in the same manner as in the prior art, so that the intensity of illumination of the lamps $L_1$-$L_N$ can be controlled in accordance therewith.

On the other hand, in the case a positive surge voltage is applied to the power terminal +B, if the transistor 22 is 'ON', the positive surge voltage is applied to the opposite ends of the Zener diode in the condition that part of the voltage is absorbed by the resistors 27 and 28. Then, the Zener diode 62 is operated, whereby an electric potential of a signal applied to the base of the dimming transistor 10 comes to be substantially same as the grounding potential, whereby the dimming transistor 10 is turned 'OFF', so that the dimming transistor 10 can be protected from the positive surge voltage. In addition, when a negative surge voltage is applied, the negative surge voltage is absorbed by the diodes 42 and 49, so that the dimming transistor 10 can be protected therefrom.

In this embodiment, the surge voltage sensing means and the transistor shutoff means are combined in function, whereby the construction is simplified, thereby resulting in inexpensive costs in manufacture.

Figure 6:
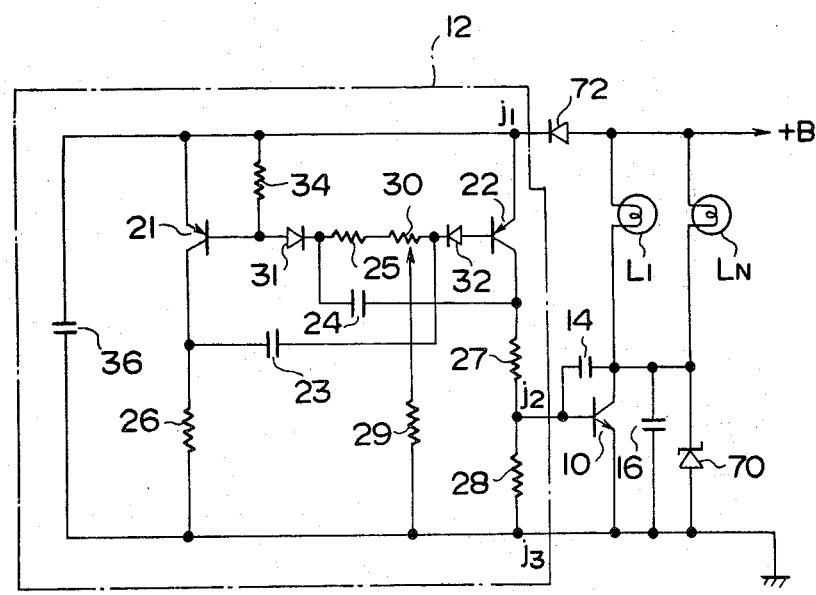
FIG. 6 is a circuit diagram also showing the fourth embodiment.

FIG. 6 shows a fourth embodiment of the present invention. This embodiment is of such an arrangement that, in the dimmer similarly to the conventional example as shown in FIG. 1, there are additionally provided a Zener diode 70 functioning as the surge voltage sensing means and transistor shutoff means in common and a diode 72 inserted between the power terminal +B and the power line of the switching circuit 12, and a resistor 34 inserted between the power line and the base of the transistor 21 in the switching circuit 12 and a capacitor 36 for stabilizing the switching circuit, which is also inserted between the power source line and the grounding are additionally provided. Since other respects are similar to the conventional example as shown in FIG. 1, description thereof will be omitted.

In this embodiment, firstly, during normal condition where no surge voltage is applied thereto, a voltage applied to the opposite ends of the Zener diode 70 through the lamps $L_1$-$L_N$ is lower than the preset voltage value, whereby the Zener diode 70 is kept 'OFF'. Consequently, the dimming transistor 10 is turned 'ON' or 'OFF' by the pulse output having the predetermined duty ratio determined by the value of the variable resistor 30 of the switching circuit 12 in the same manner as in the prior art, so that the intensity of illumination of the lamps $L_1$-$L_N$ can be controlled in accordance therewith.

On the other hand, when a positive surge voltage is applied to the power terminal +B, the positive surge voltage is applied to the opposite ends of the Zener diode through the lamps $L_1$-$L_N$. Then, the Zener diode 70 is turned 'ON' and an electric potential of the collector of the dimming transistor 10 is forcedly brought to be substantially same as the grounding potential, whereby the dimming transistor 10 is substantially turned 'OFF', so that the dimming transistor 10 can be protected from the positive surge voltage. Additionally, when a negative surge voltage is applied, the negative surge voltage is absorbed by the Zener diode 70 and diode 72, so that the dimming transistor 10 can be protected.

In this embodiment also, the surge voltage sensing means and the transistor shutoff means are combined in function, whereby the construction is simplified, thereby resulting in inexpensive costs in manufacture.

In addition, in all of the abovedescribed embodiments, the present invention is applied to the dimmer for the lamp or lamps illuminating the instrument panel in the compartment of the motor car, however, it should be understood there is no intention to limit the scope of application of the invention thereto, but on the contrary, the invention is to cover the dimmers generally used.

From the foregoing description, it should be apparent to one skilled in the art that the abovedescribed embodiment is but one of many possible specific embodiments which can represent the applications of the principles of the present invention. Numerous and varied other arrangements can be readily devised by those skilled in the art without departing from the spirit and scope of the invention.

What is claimed is:

1. A dimmer comprising:
   a dimming transistor connected to a lamp or lamps to be dimmed for controlling an electric current supplied to said lamp,
   a switching circuit connected to said dimming transistor for generating pulses having a controllable duty ratio to cause said dimming transistor to turn 'ON' or 'OFF',
   surge voltage sensing means having a varistor inserted between a power terminal and grounding, a first diode inserted between the power terminal and power line of said switching circuit, a Zener diode connected at one end to a cathode constituting an output end of said first diode, a series combination of first and second resistors connecting the other end of said Zener diode to grounding, and a second diode inserted between a power control terminal of said lamp and the grounding.

2. A dimmer comprises:
   a dimming transistor connected to a lamp or lamps to be dimmed for controlling an electric current supplied to said lamp,
   a switching circuit connected to said dimming transistor for generating pulses having a controllable duty ratio to cause said dimming transistor to turn 'ON' or 'OFF',
   surge voltage sensing means having a capacitor inserted between power terminal and grounding, a diode inserted between the power terminal and power line of said switching circuit, resistors and a Zener diode inserted between a cathode constituting an output end of said diode and the grounding, and a diode inserted between power control terminal of said lamp and the grounding,
   transistor shutoff means including a shutoff transistor, a base of which is connected to a connecting point between the resistors of said surge voltage sensing means, an emitter of which is connected to the power line of said switching circuit, and a collector of which is connected to a connecting point between a diode and a variable resistor of said switching circuit.

3. A dimmer comprising:
   a dimming transistor connected to a lamp or lamps to be dimmed for controlling an electric current supplied to said lamp,
   a switching circuit connected to said dimming transistor for generating pulses having a controllable duty ratio to cause said dimming transistor to turn 'ON' or 'OFF',
   surge voltage sensing and transistor shutoff means having a diode inserted between a power terminal and power line of said switching circuit, a diode inserted between a power control terminal of said lamp and ground, and a Zener diode inserted between a base and an emitter of said dimming transistor.

4. A dimmer comprising:
   a dimming transistor connected to a lamp or lamps to be dimmed for controlling an electric current supplied to said lamp,
   a switching circuit connected to said dimming transistor for generating pulse having a controllable duty ratio to cause said dimming transistor to turn 'ON' or 'OFF',
   surge voltage sensing and transistor shutoff means having a Zener diode inserted between a power control terminal of said lamp and ground, a diode inserted between a power terminal and a power line of said switching circuit, a resistor connected between a base and an emitter of one of a pair of transistors of said switching circuit, and a capacitor connected between said power line and ground.

* * * * *